United States Patent
Gokavarapu et al.

(10) Patent No.: US 11,611,563 B2
(45) Date of Patent: Mar. 21, 2023

(54) SYSTEM AND METHOD FOR SECURE SHELL API CONNECTOR

(71) Applicant: JPMorgan Chase Bank, N.A., New York, NY (US)

(72) Inventors: Hanuman Gopi Krishna Gokavarapu, Hyderabad (IN); Rahul D Kulkarni, Katy, TX (US); Paolo T Ballesteros, Houston, TX (US)

(73) Assignee: JPMORGAN CHASE BANK N.A., New York, NY (US)

( * ) Notice: Subject to any disclaimer, the term of this patent is extended or adjusted under 35 U.S.C. 154(b) by 302 days.

(21) Appl. No.: 17/114,944

(22) Filed: Dec. 8, 2020

(65) Prior Publication Data
US 2022/0182391 A1    Jun. 9, 2022

(51) Int. Cl.
*H04L 9/40* (2022.01)
*G06F 8/71* (2018.01)
*G06F 9/54* (2006.01)

(52) U.S. Cl.
CPC .............. *H04L 63/104* (2013.01); *G06F 8/71* (2013.01); *G06F 9/547* (2013.01); *H04L 63/101* (2013.01)

(58) Field of Classification Search
CPC ..... H04L 63/06; H04L 63/065; H04L 63/101; H04L 63/104; H04L 63/1433; G06F 9/547
See application file for complete search history.

(56) References Cited

U.S. PATENT DOCUMENTS

| | | | | |
|---|---|---|---|---|
| 10,110,600 | B1* | 10/2018 | Simca | G06N 20/00 |
| 10,592,485 | B1* | 3/2020 | Morgan | G06F 16/252 |
| 2007/0005801 | A1* | 1/2007 | Kumar | H04L 69/32 |
| | | | | 709/238 |
| 2015/0188949 | A1* | 7/2015 | Mahaffey | H04L 63/0272 |
| | | | | 726/1 |
| 2015/0213268 | A1* | 7/2015 | Nance | G06F 21/577 |
| | | | | 726/1 |

(Continued)

OTHER PUBLICATIONS

Atlassian, "Connecting Bitbucket Server to an existing LDAP directory" [Online], Jan. 29, 2019 [Retrieved on: Nov. 29, 2022] Retrieved from: < https://confluence.atlassian.com/bitbucketserver050/connecting-bitbucket-server-to-an-existing-ldap-directory-913474949.html > (Year: 2019).*

(Continued)

*Primary Examiner* — Eric W Shepperd
(74) *Attorney, Agent, or Firm* — Greenblum & Bernstein, P.L.C.

(57) ABSTRACT

Various methods, apparatuses/systems, and media for implementing an SSH connector are disclosed. A processor deploys a first API to get an active directory groups with a first user list data from a repository. The processor deploys a second API that calls an active directory to get a second user list data that lists users who are in given active directory groups that are authenticated and authorized. The processor also compares the first user list data to the second user list data; deploys a third API that returns active directory groups with users who are listed in the first user list data in the repository but not in the second user list data in the active directory groups; and deploys a fourth API that calls the repository to remove the users from groups in the repository who are not in the second user list data in the active directory groups.

20 Claims, 8 Drawing Sheets

(56) References Cited

U.S. PATENT DOCUMENTS

| | | | |
|---|---|---|---|
| 2020/0004946 A1* | 1/2020 | Gilpin | H04L 63/10 |
| 2021/0084063 A1* | 3/2021 | Triantafillos | H04L 63/1433 |
| 2022/0215101 A1* | 7/2022 | Rioux | G06F 21/55 |

OTHER PUBLICATIONS

Atlassian, "The Difference Between Delegated and Connector LDAP User Directories" [Online], Aug. 13, 2018 [Retrieved on: Nov. 29, 2022] Retrieved from: < https://confluence.atlassian.com/confkb/the-difference-between-delegated-and-connector-ldap-user-directories-648544872.html > (Year: 2018).*

MiniOrange, "User Sync and Group Sync for Azure AD" [Online], Jan. 6, 2020 [Retrieved: Nov. 29, 2022], www.miniorange.com, Retrieved from: < https://miniorange.com/atlassian/user-and-group-sync-user-provisioning-azure-ad/ > (Year: 2020).*

\* cited by examiner

SYSTEM AND METHOD FOR SECURE SHELL API CONNECTOR

TECHNICAL FIELD

This disclosure generally relates to secure shell (SSH) connector, and, more particularly, to methods and apparatuses for implementing an external SSH connector which runs for a predetermined time period and updates users' permission in a repository who are not part of an active directory (AD) group.

BACKGROUND

Often, a developer may need to access a web-based version control repository (i.e., a Bitbucket) for source code for developing the application. Typically, there may be two available protocols (Hypertext Transfer Protocol Secure (HTTPS), SSH) to connect to a Bitbucket to perform Global Information Tracker (GIT) operations, e.g., clone, push, pull, fetch, merge etc. As SID (security identifier) are using delegated connector (sync issues with standard connectors) in Bitbucket, there appears to be no option to remove users from group if they are using SSH keys once they are removed from AD group, e.g., user can perform GIT client operation (clone, push, etc.) even if they are removed from AD group. There appears to be a potential bug in authorization of Bitbucket for AD teams who are using SSH keys when it integrates with AD by delegated connector.

Typically, there are three types of SSH keys that may be present in Bitbucket-Access, User, and Service. User Keys (e.g., function identifier (FID) and SID) may be public key and private key that are generated at their local machines. Users are added to projects by project admins from DevX portal (a platform for developer to meet and corroborate). Once ID is added, corresponding ID will get access and can use "SSH" and clone or push the code to Bitbucket. Bitbucket project admins can login to Bitbucket and will have an option to add Access Key, where they can add public keys. Using private key in their CI (continuous integration) systems or in their local machines, they are able to clone, or if the system has RW (write) permission, they can push the code to Bitbucket projects. In this case, it is not necessary to be a part of any USER or FID. All they need is using "ssh-keygen" tool to generate public and private key. Currently, as public or private keys are generated with no expiration date, if anyone left the team and if they know the private key, they still can clone or push the code. Service keys are typically used in mirroring data.

When Bitbucket is configured with an identity provider such as Microsoft® Active Directory (AD) and an out of the box Bitbucket delegated connector, the application developers using SSH keys or SSH protocol may have unauthorized permissions to source code under certain scenarios. This may leave a big gap in the delegated authorization model. Some exemplary scenarios may include: (i) if the developer is removed from Microsoft® AD, then the corresponding developer can still have access and permissions to the Bitbucket repositories when using SSH protocol; (ii) if the developer is moved from one group to another group, then the corresponding developer can still have access and permissions to the Bitbucket older repositories when using SSH protocol.

To work around this limitation in the above-described scenarios, a user may need to login manually to Bitbucket via https to sync up the latest permissions from the AD. However, this manual login may prove to be very unreliable and may not be enforceable easily at scale.

Thus, this big gap in authorization model under certain conditions compromises highly confidential source code by allowing unauthorized access. In addition, the developed product may prove to be non-compliant to an organization's standard access and re-certification policies.

SUMMARY

The present disclosure, through one or more of its various aspects, embodiments, and/or specific features or sub-components, provides, among other features, various systems, servers, devices, methods, media, programs, and platforms for implementing a secure shell (SSH) connector for SSH keys in a repository which may run periodically in accordance with a predetermined interval, remove SSH users who are not part of active directory groups, and update users permission in the repository who are not part of the active directory groups, thereby maintaining authorization and authentication for active directory teams in an organization as per active directory, but the disclosure is not limited thereto.

According to an aspect of the present disclosure, a method for implementing a secure shell (SSH) connector by utilizing one or more processors and one or more memories is disclosed. The method may include: deploying a first application programming interface (API) that calls a repository external to an SSH connector to get a first user list data that lists users who are using SSH keys and corresponding active directory groups, receiving the active directory groups with the first user list data from the repository, deploying a second API that calls an active directory to get a second user list data that lists users who are in given active directory groups that are authenticated and authorized; receiving the given active directory groups with the second user list data from the active directory; comparing the first user list data to the second user list data, deploying a third API that returns active directory groups with users who are listed in the first user list data in the repository but not in the second user list data in the active directory groups; and deploying a fourth API that calls the repository to remove the users from groups in the repository who are not in the second user list data in the active directory groups.

According to a further aspect of the present disclosure, the repository may be a web-based version control repository that stores source code for developing an application, but the disclosure is not limited thereto.

According to yet another aspect of the present disclosure, the repository may be a cloud-based repository that supports user authentication, repository security, and integration with existing databases and developments, but the disclosure is not limited thereto.

According to a further aspect of the present disclosure, the method may further include: running the SSH connector periodically in accordance with a predetermined interval; removing SSH users who are not part of the active directory groups; and updating users permission in the repository who are not part of the active directory groups.

According to another aspect of the present disclosure, the predetermined interval may be one hour, but the disclosure is not limited thereto.

According to an additional aspect of the present disclosure, the active directory may be a Microsoft® active directory, but the disclosure is not limited thereto.

According to yet another aspect of the present disclosure, the first API may be a Get Bitbucket Group API; the second API may be a Get Active Directory Group API, the third API may be a Validate Members in Group API, and the fourth API may be a Remove Members in Group API, but the disclosure is not limited thereto.

According to a further aspect of the present disclosure, a system for implementing a secure shell (SSH) connector is disclosed. The system may include a processor; a receiver; and a repository, external to an SSH connector, operatively connected with the processor and the receiver via a communication network, the repository having one or more memories that store a first user list data that lists users who are using SSH keys and corresponding active directory groups. The processor may be configured to: deploy a first application programming interface (API) that calls the repository to get the first user list data; cause the receiver to receive the active directory groups with the first user list data from the repository, deploy a second API that calls an active directory to get a second user list data that lists users who are in given active directory groups that are authenticated and authorized; cause the receiver to receive the given active directory groups with the second user list data from the active directory; compare the first user list data to the second user list data; deploy a third API that returns active directory groups with users who are listed in the first user list data in the repository but not in the second user list data in the active directory groups; and deploy a fourth API that calls the repository to remove the users from groups in the repository who are not in the second user list data in the active directory groups.

According to another aspect of the present disclosure, the processor may be further configured to: run the SSH connector periodically in accordance with a predetermined interval, remove SSH users who are not part of the active directory groups, and update users' permission in the repository who are not part of the active directory groups.

According to another aspect of the present disclosure, a non-transitory computer readable medium configured to store instructions for implementing a secure shell (SSH) connector is disclosed. The instructions, when executed, may cause a processor to perform the following: deploying a first application programming interface (API) that calls a repository external to an SSH connector to get a first user list data that lists users who are using SSH keys and corresponding active directory groups, causing a receiver to receive the active directory groups with the first user list data from the repository; deploying a second API that calls an active directory to get a second user list data that lists users who are in given active directory groups that are authenticated and authorized, causing the receiver to receive the given active directory groups with the second user list data from the active directory, comparing the first user list data to the second user list data; deploying a third API that returns active directory groups with users who are listed in the first user list data in the repository but not in the second user list data in the active directory groups; and deploying a fourth API that calls the repository to remove the users from groups in the repository who are not in the second user list data in the active directory groups.

According to a further aspect of the present disclosure, when executed, the instructions may further cause the processor to perform the following: running the SSH connector periodically in accordance with a predetermined interval; removing SSH users who are not part of the active directory groups; and updating users permission in the repository who are not part of the active directory groups.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
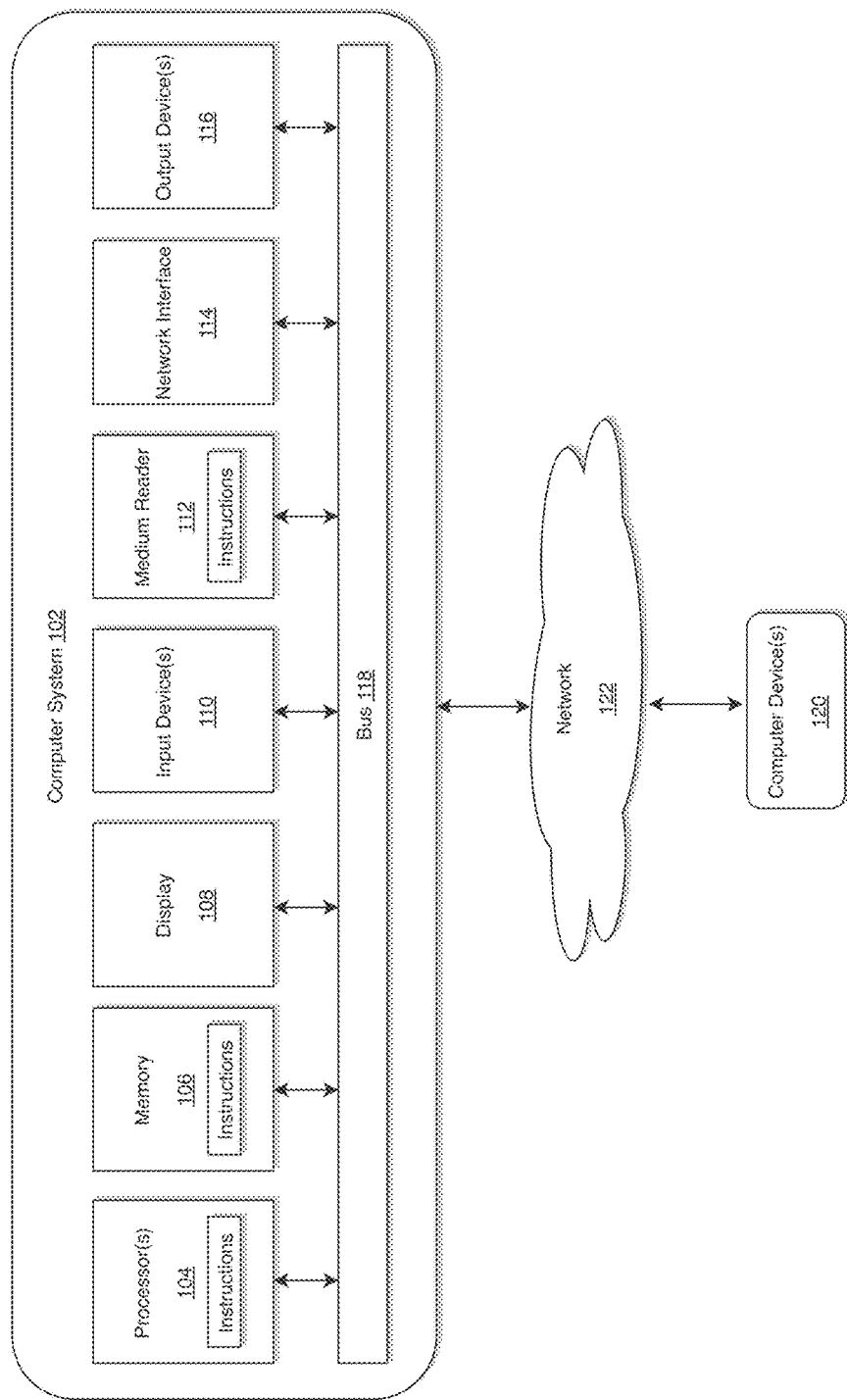
FIG. 1 illustrates a computer system for implementing a secure shell (SSH) connector module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing an SSH connector module in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a secure shell (SSH) connector for SSH keys in a repository which may run periodically in accordance with a predetermined interval, remove SSH users who are not part of active directory groups, and update users permission in the repository who are not part of the active directory groups, thereby maintaining authorization and authentication for active directory teams in an organization as per active directory, but the disclosure is not limited thereto.

Figure 2:
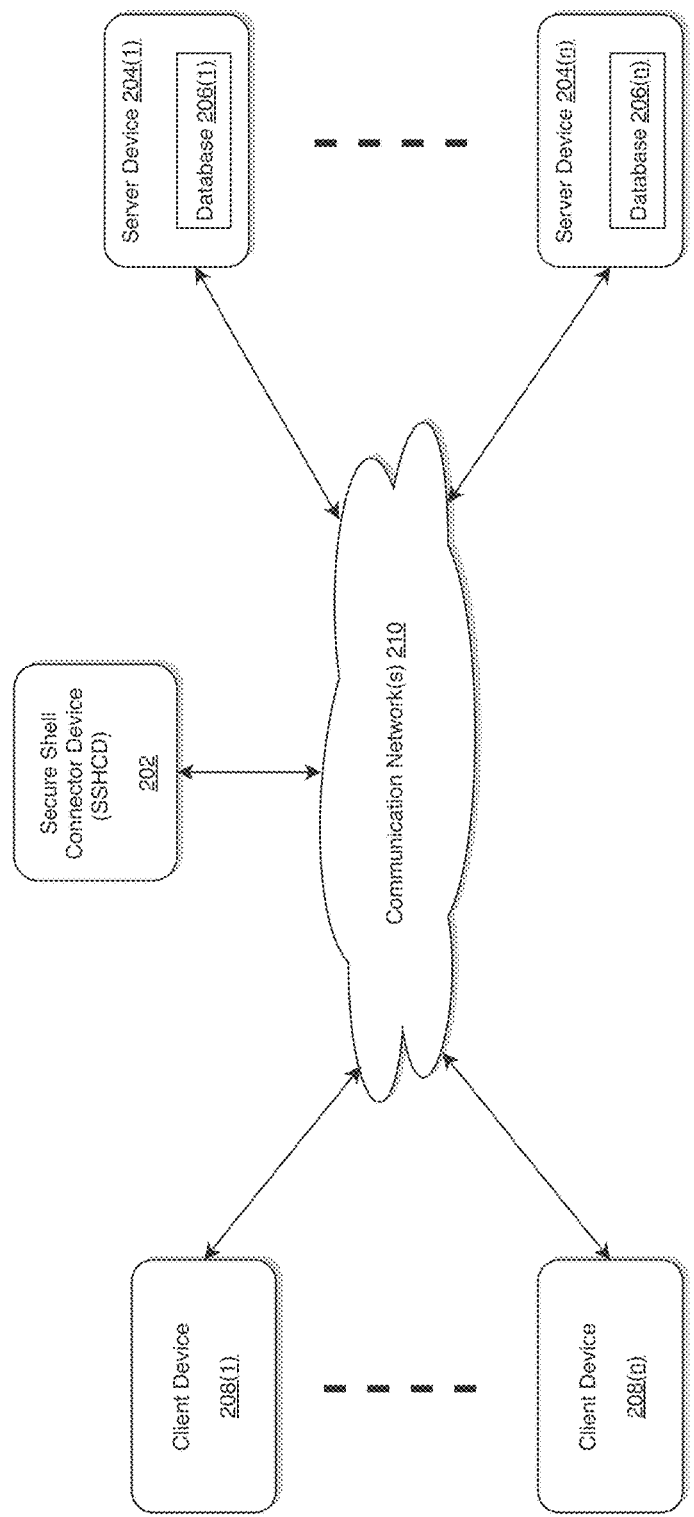
FIG. 2 illustrates an exemplary diagram of a network environment with an SSH connector device in accordance with an exemplary embodiment.

Referring to FIG. 2, a schematic of an exemplary network environment 200 for implementing an SSH connector device (SSHCD) of the instant disclosure is illustrated.

According to exemplary embodiments, the above-described problems associated with conventional connectors may be overcome by implementing an SSHCD 202 having an SSHCD connector as illustrated in FIG. 2 by removing SSH users who are not part of active directory groups, and updating users permission in the repository who are not part of the active directory groups, thereby maintaining authorization and authentication for active directory teams in an organization as per active directory, but the disclosure is not limited thereto.

The SSHCD 202 may be the same or similar to the computer system 102 as described with respect to FIG. 1.

The SSHCD 202 may store one or more applications that can include executable instructions that, when executed by the SSHCD 202, cause the SSHCD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSHCD 202 itself, may be located in virtual server(s) running in a cloud-based computing environment rather than being tied to one or more specific physical network computing devices. Also, the application(s) may be running in one or more virtual machines (VMs) executing on the SSHCD 202. Additionally, in one or more embodiments of this technology, virtual machine(s) running on the SSHCD 202 may be managed or supervised by a hypervisor.

In the network environment 200 of FIG. 2, the SSHCD 202 is coupled to a plurality of server devices 204(1)-204(n) that hosts a plurality of databases 206(1)-206(n), and also to a plurality of client devices 208(1)-208(n) via communication network(s) 210. A communication interface of the SSHCD 202, such as the network interface 114 of the computer system 102 of FIG. 1, operatively couples and communicates between the SSHCD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSHCD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use Transmission Control Protocol/Internet Protocol (TCP/IP) over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SSHCD 202 may be a standalone device or integrated with one or more other devices or apparatuses, such as one or more of the server devices 204(1)-204(n), for example. In one particular example, the SSHCD 202 may be hosted by one of the server devices 204(1)-204(n), and other arrangements are also possible. Moreover, one or more of the devices of the SSHCD 202 may be in a same or a different communication network including one or more public, private, or cloud networks, for example.

The plurality of server devices 204(1)-204(n) may be the same or similar to the computer system 102 or the computer device 120 as described with respect to FIG. 1. including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSHCD 202 via the communication network(s) 210 according to the Hypertext Transfer Protocol (HTTP)-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SSHCD 202 that may be configured for implementing a secure shell (SSH) connector for SSH keys in a repository which may run periodically in accordance with a predetermined interval, remove SSH users who are not part of active directory groups, and update users permission in the repository who are not part of the active directory groups, thereby maintaining authorization and authentication for active directory teams in an organization as per active directory, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the SSHCD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SSHCD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SSHCD 202, the server devices 204(1)-204(n), or the client devices 208(1)-208(n), for example, may be configured to operate as virtual instances on the same physical machine. For example, one or more of the SSHCD 202, the server devices 204(1)-204(n), or the client devices 208(1)-208(n) may operate on the same physical device rather than as separate devices communicating through communication network(s) 210. Additionally, there may be more or fewer SSHCDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
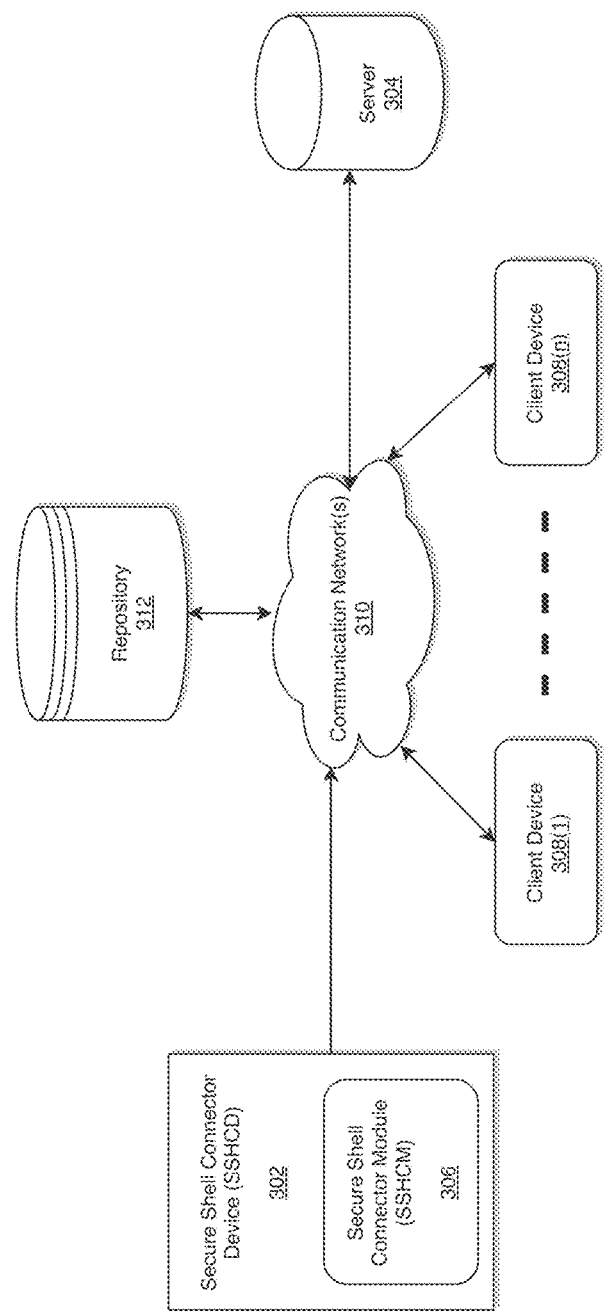
FIG. 3 illustrates a system diagram for implementing an SSH connector device with an SSH connector module in accordance with an exemplary embodiment.

FIG. 3 illustrates a system diagram 300 for implementing a secure shell (SSH) connector device (SSHCD) with a secure shell (SSH) connector module (SSHCM) in accordance with an exemplary embodiment.

As illustrated in FIG. 3, the SSHCD 302 including the SSHCM 306 may be connected to a server 304, and a repository 312 via a communication network 310. The SSHCD 302 may also be connected to a plurality of client devices 308(1)-308(n) via the communication network 310, but the disclosure is not limited thereto. According to exemplary embodiments, the SSHCM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the SSHCD 302 is described and shown in FIG. 3 as including the SSHCM 306, although it may include other rules, policies, modules, databases, or applications, for example. According to exemplary embodiments, the repository 312 may be embedded within the SSHCD 302. Although only one repository 312 is illustrated in FIG. 3, according to exemplary embodiments, a plurality of repositories 312 may be provided. The repository 312 may include one or more memories configured to store a first user list data that lists users who are using SSH keys and corresponding active directory groups, but the disclosure is not limited thereto. For example, the repository 312 may include one or more memories configured to store information including: rules, programs, production requirements, configurable threshold values defined by a product team to validate against service level objective (SLO), machine learning models, log data, hash values, etc., but the disclosure is not limited thereto. According to exemplary embodiments, the SSHCM 306 may be configured to be storage platform agnostic—configured to be deployed across multiple storage layers.

According to exemplary embodiments, the SSHCM 306 may be configured to receive continuous feed of data from the repository 312 via the communication network 310.

As will be described below, the SSHCM 306 may be configured to deploy a first application programming interface (API) that calls the repository to get the first user list data; cause a receiver to receive the active directory groups with the first user list data from the repository; deploy a second API that calls an active directory to get a second user list data that lists users who are in given active directory groups that are authenticated and authorized; cause the receiver to receive the given active directory groups with the second user list data from the active directory, compare the first user list data to the second user list data; deploy a third API that returns active directory groups with users who are listed in the first user list data in the repository but not in the second user list data in the active directory groups; and deploy a fourth API that calls the repository to remove the users from groups in the repository who are not in the second user list data in the active directory groups, but the disclosure is not limited thereto.

The plurality of client devices 308(1)-308(n) are illustrated as being in communication with the SSHCD 302. In this regard, the plurality of client devices 308(1)-308(n) may be "clients" of the SSHCD 302 and are described herein as such. Nevertheless, it is to be known and understood that the plurality of client devices 308(1)-308(n) need not necessarily be "clients" of the SSHCD 302, or any entity described in association therewith herein. Any additional or alternative relationship may exist between either or more of the plurality of client devices 308(1)-308(n) and the SSHCD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the SSHCD 302 via broadband or cellular communication. Of course, these embodiments are merely exemplary and are not limiting or exhaustive.

Figure 4:
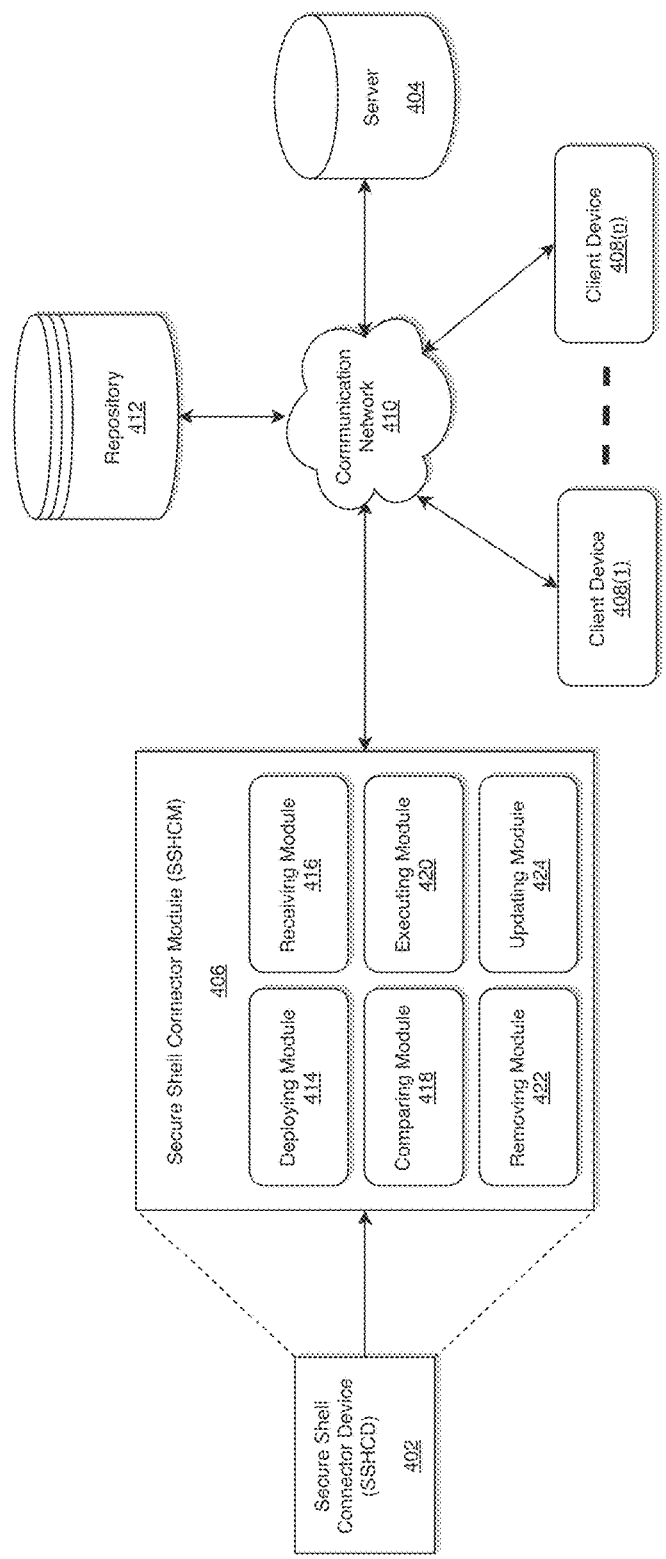
FIG. 4 illustrates a system diagram for implementing an SSH connector module of FIG. 3 in accordance with an exemplary embodiment.

FIG. 4 illustrates a system diagram for implementing a secure shell (SSH) connector module of FIG. 3 in accordance with an exemplary embodiment. As illustrated in FIG. 4, the system 400 may include a secure shell (SSH) connector device (SSHCD) 402 within which a secure shell (SSH) connector module (SSHCM) 406 may be embedded, a repository 412, a server 404, client devices 408(1)-408(n), and a communication network 410. According to exemplary embodiments, the SSHCD 402, SSHCM 406, repository 412, the server 404, the client devices 408(1)-408(n), and the communication network 410 as illustrated in FIG. 4 may be the same or similar to the SSHCD 302, the SSHCM 306, the repository 312, the server 304, the client devices 308(1)-308(n), and the communication network 310, respectively, as illustrated in FIG. 3.

According to exemplary embodiments, the repository 312, 412 may be a cloud-based repository (i.e., Bitbucket) that supports user authentication, repository security, and integration with existing databases and developments, but the disclosure is not limited thereto.

As illustrated in FIG. 4, the SSHCM 406 may include a deploying module 414, a receiving module 416, a comparing module 418, an executing module 420, a removing module 422, and an updating module 424. According to exemplary embodiments, the repository 412 may be external to the SSHCD 402 may include various systems that are managed and operated by an organization. Alternatively, according to exemplary embodiments, the repository 412 may be embedded within the SSHCD 402 and/or the SSHCM 406.

The process may be executed via the communication network 410, which may comprise plural networks as described above. For example, in an exemplary embodiment, the various components of the SSHCM 406 may communicate with the server 404, and the repository 412 via the communication network 410. Of course, these embodiments are merely exemplary and are not limiting or exhaustive.

According to exemplary embodiments, the communication network 410 and the communication module 426 may be configured to establish a link between the repository 412, the client devices 408(1)-408(n) and the SSHCM 406.

According to exemplary embodiments, each of the deploying module 414, receiving module 416, comparing module 418, executing module 420, removing module 422, and the updating module 424 may be implemented by microprocessors or similar, they may be programmed using software (e.g., microcode) to perform various functions discussed herein and may optionally be driven by firmware and/or software. Alternatively, each of the deploying module 414, receiving module 416, comparing module 418, executing module 420, removing module 422, and the updating module 424 may be implemented by dedicated hardware, or as a combination of dedicated hardware to perform some functions and a processor (e.g., one or more programmed microprocessors and associated circuitry) to perform other functions. Also, according to exemplary embodiments, each of the deploying module 414, receiving module 416, comparing module 418, executing module 420, removing module 422, and the updating module 424 may be physically separated into two or more interacting and discrete blocks, units, devices, and/or modules without departing from the scope of the inventive concepts.

Figure 5:
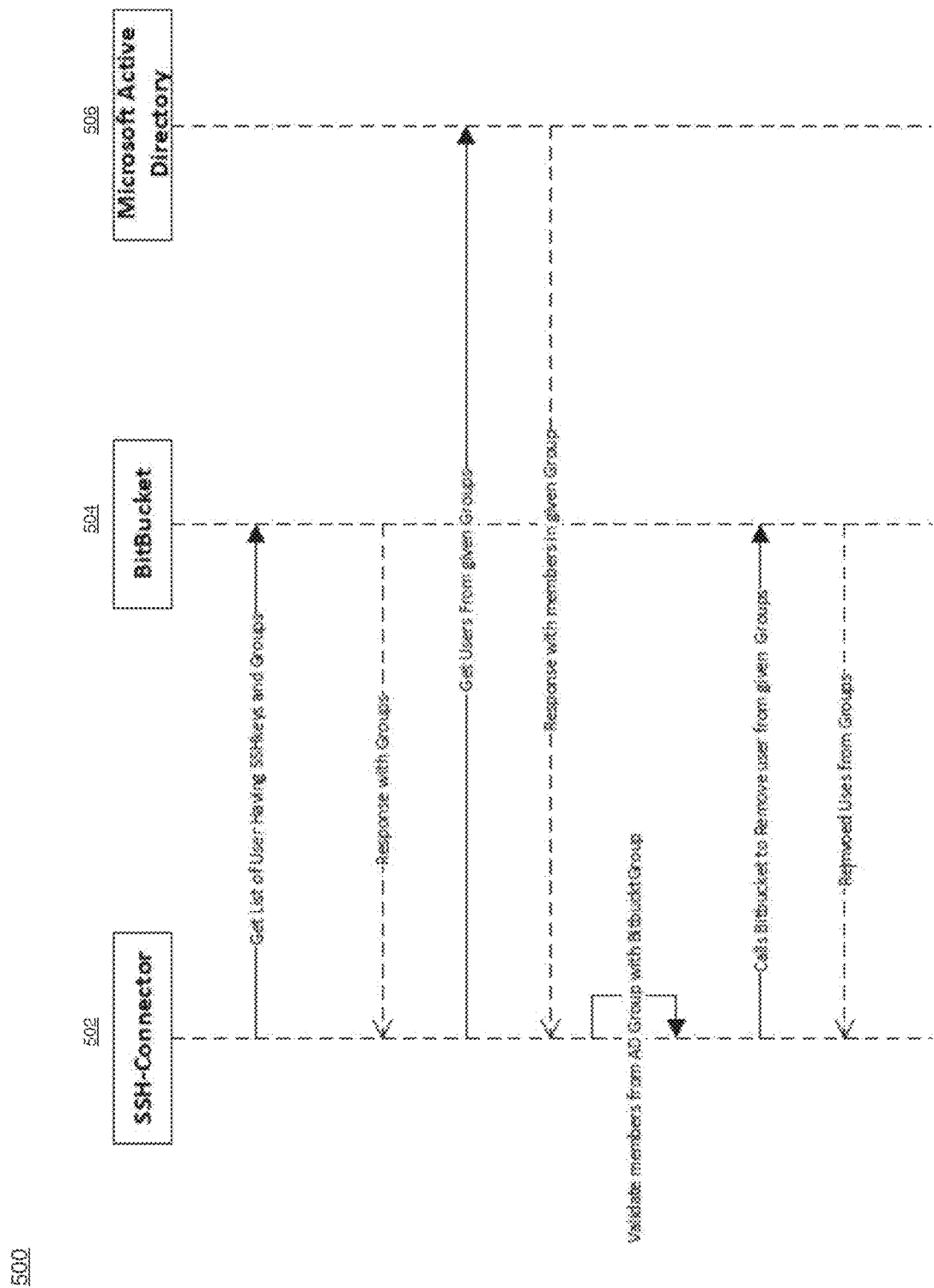
FIG. 5 illustrates an exemplary sequence diagram for implementing an SSH connector module of FIG. 4 in accordance with an exemplary embodiment.

FIG. 5 illustrates an exemplary sequence diagram for implementing an SSH connector module of FIG. 4 in accordance with an exemplary embodiment. The sequence diagram 500 illustrate now of data among an SSH-connector 502, a Bitbucket 504, and a Microsoft® active directory 506.

Referring to FIGS. 4 and 5, the deploying module 414 may be configured to deploy a first application programming interface (API) that calls a repository 412 (or Bitbucket 504) external to the SSH connector 502 to get a first user list data that lists users who are using SSH keys and corresponding active directory groups.

According to exemplary embodiments, the receiving module 416 may be configured to receive the active directory groups with the first user list data from the repository 412 (or Bitbucket 504).

According to exemplary embodiments, the deploying module 414 may deploy a second API that calls the Microsoft® active directory 506 to get a second user list data that lists users who are in given active directory groups that are authenticated and authorized.

According to exemplary embodiments, the receiving module 416 may receive the given active directory groups with the second user list data from the Microsoft® active directory 506.

According to exemplary embodiments, the comparing module 418 may be configured to compare the first user list data to the second user list data.

According to exemplary embodiments, the deploying module 414 may deploy a third API that returns active directory groups with users who are listed in the first user list data in the repository 412 (or Bitbucket 504) but not in the second user list data in the Microsoft® active directory 506.

According to exemplary embodiments, the deploying module 414 may deploy a fourth API that calls the repository 412 (or Bitbucket 504) to remove the users from groups in the repository 412 (or Bitbucket 504) who are not in the second user list data in the Microsoft® active directory 506 groups.

According to exemplary embodiments, the repository 412 (or Bitbucket 504) may be a web-based version control repository that stores source code for developing an application, but the disclosure is not limited thereto.

According to exemplary embodiments, the repository 412 (or Bitbucket 504) may also be a cloud-based repository that supports user authentication, repository security, and integration with existing databases and developments, but the disclosure is not limited thereto.

According to exemplary embodiments, the executing module 420 may run the SSH-connector 502 periodically in accordance with a predetermined interval. The removing module 422 may remove SSH users who are not part of the Microsoft® active directory 506 groups. The updating module 424 may update users' permission in the repository 412 (or Bitbucket 504) who are not part of the Microsoft® active directory 506 groups.

According to exemplary embodiments, the predetermined interval may be one hour, but the disclosure is not limited thereto. Any other desired time interval may be chosen to run the SSH-connector 502

According to exemplary embodiments, the active directory may be a Microsoft® active directory, but the disclosure is not limited thereto.

According to exemplary embodiments, the first API may be a Get Bitbucket Group API, the second API may be a Get Active Directory Group API, the third API may be a Validate Members in Group API; and the fourth API may be a Remove Members in Group API, but the disclosure is not limited thereto.

According to exemplary embodiments, the SSHCM 406 may get a list of users who are using SSH keys and corresponding active directory groups which is part of "delegated LDAP (lightweight directory access protocol) authentication—users" user directory.

According to exemplary embodiments, the SSHCM 406 may get a difference list of active directory groups where users are using SSH keys and corresponding active directory groups is part of "delegated LDAP (lightweight directory access protocol) authentication—users" user directory, and groups and members from active directory for given Bitbucket groups. According to exemplary embodiments, the SSHCM 406 may remove users from active directory groups from Bitbucket 504 side who are not part of the Microsoft® active directory 506 groups.

Figure 6:
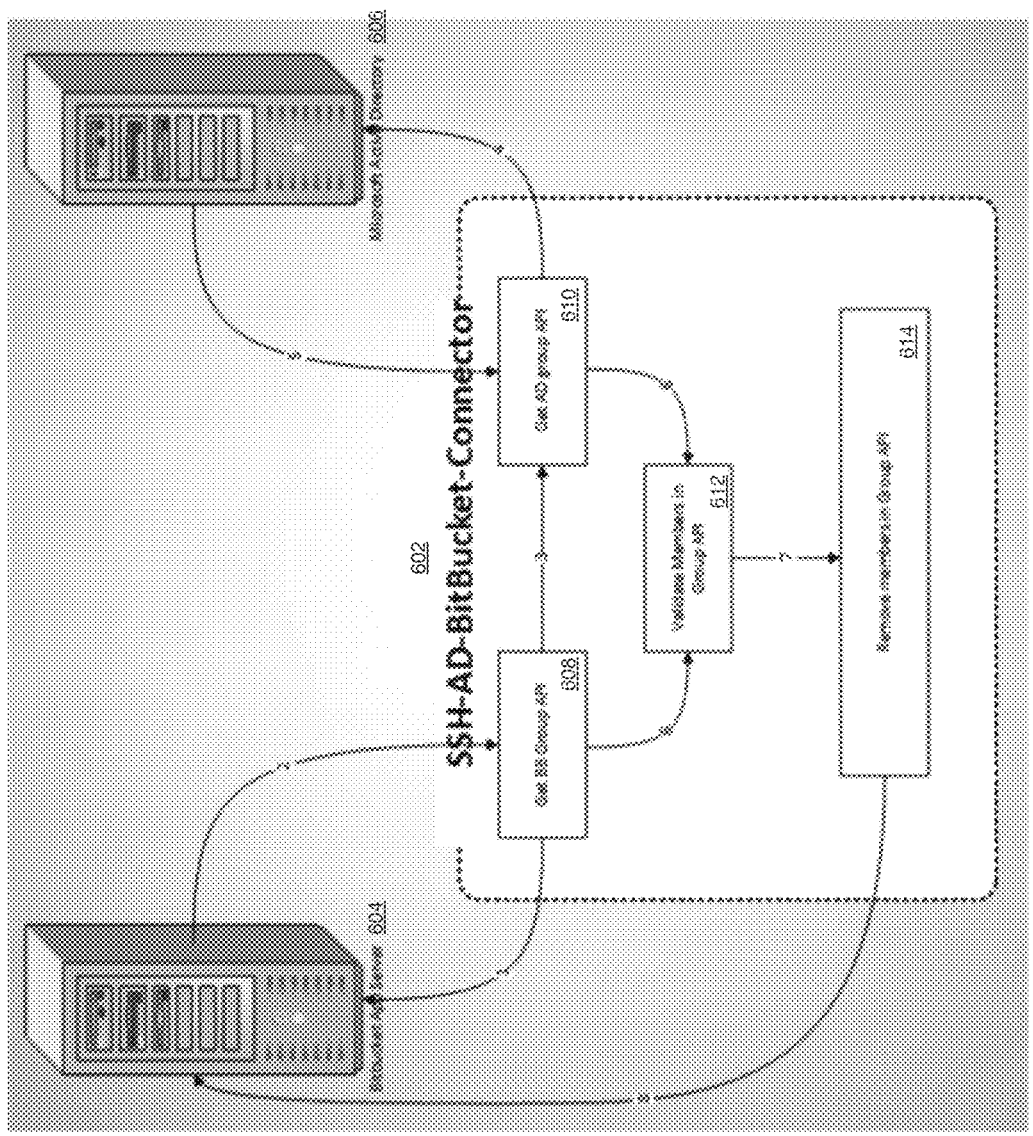
FIG. 6 illustrates a flow diagram for implementing an SSH connector module of FIG. 4 in accordance with an exemplary embodiment.
Figure 7:
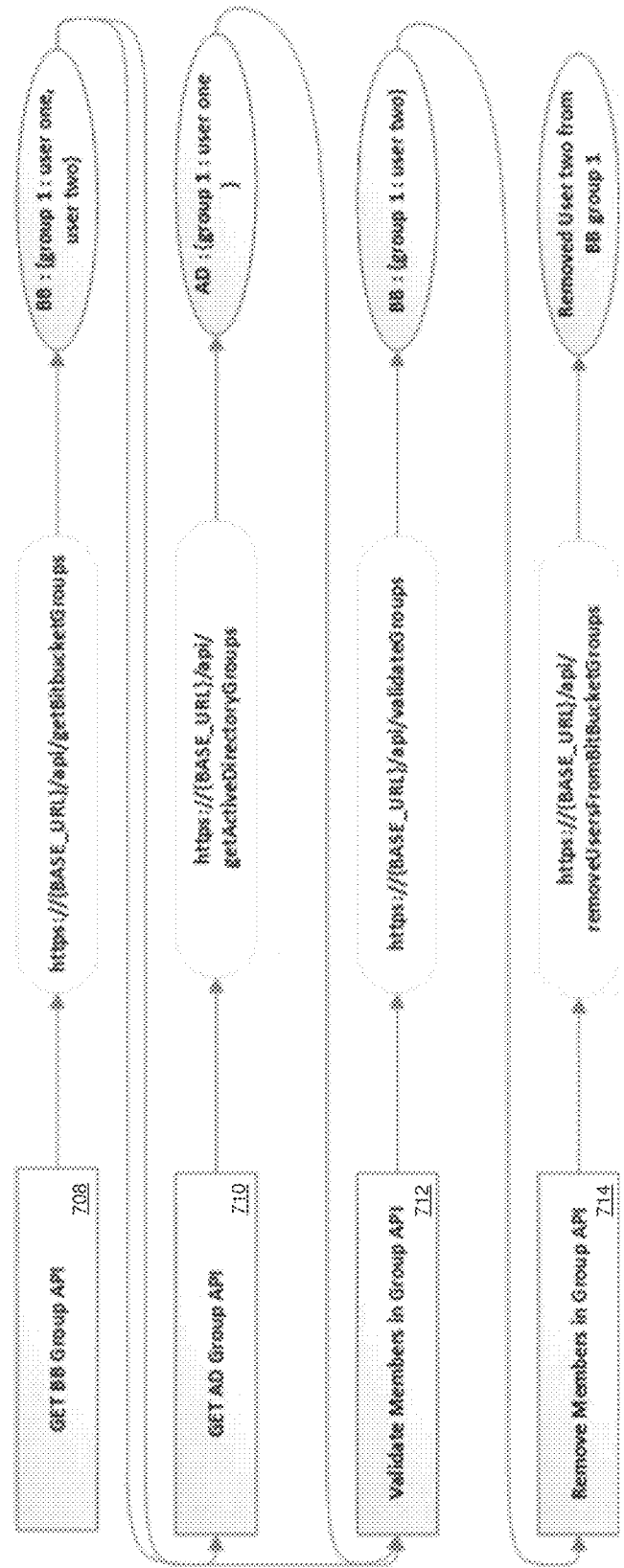
FIG. 7 illustrates an SSH-API-Connector interface in accordance with an exemplary embodiment.

FIG. 6 illustrates a flow diagram 600 for implementing an SSHCM 406 of FIG. 4 in accordance with an exemplary embodiment. As illustrated in FIG. 6, the flow diagram 600 may include an SSH active directory (AD) Bitbucket (BB) connector 602 (hereinafter, "SSH-AD connector"), a Bitbucket API server 604, and a Microsoft® active directory 606. FIG. 7 illustrates an SSH-API-Connector interface 700 in accordance with an exemplary embodiment.

As illustrated Referring to FIGS. 4-7, the SSH-AD connector 602 may invoke "Get BB Group API" 608, 708 which may call the Bitbucket API server 604 to get list of users who are using SSH keys and corresponding Microsoft® active directory groups. In response, the Bitbucket API server 604 may return AD groups with a user list, e.g., BB: {group 1: user one, user two}. The SSHCM 406 may pass groups to SSH-AD connector 602—"Get AD Groups API" 610, 710. According to exemplary embodiments, the SSH-AD connector 602 may invoke "Get AD Group API" 610, 710 which may call the Microsoft® active directory 606 to get list of users who are in given AD groups. In response, the Microsoft® active directory 606 will return groups with user list. e.g., AD: {group 1: user one}. The SSHCM 406 may pass both to SSH-AD connector 602—"Validate Members in Group API" 612, 712—which may return AD groups with users who are having user in Bitbucket 504 but not in Microsoft® active directory groups, e.g., BB: {group 1: user two}. In response, the SSH-AD connector 602 may invoke "Remove Members in Group API" 614, 714 which may call Bitbucket 504 to remove users from the given AD groups from "Validate Members in Group API" 612, 712, (e.g., removed user two from BB group 1).

Figure 8:
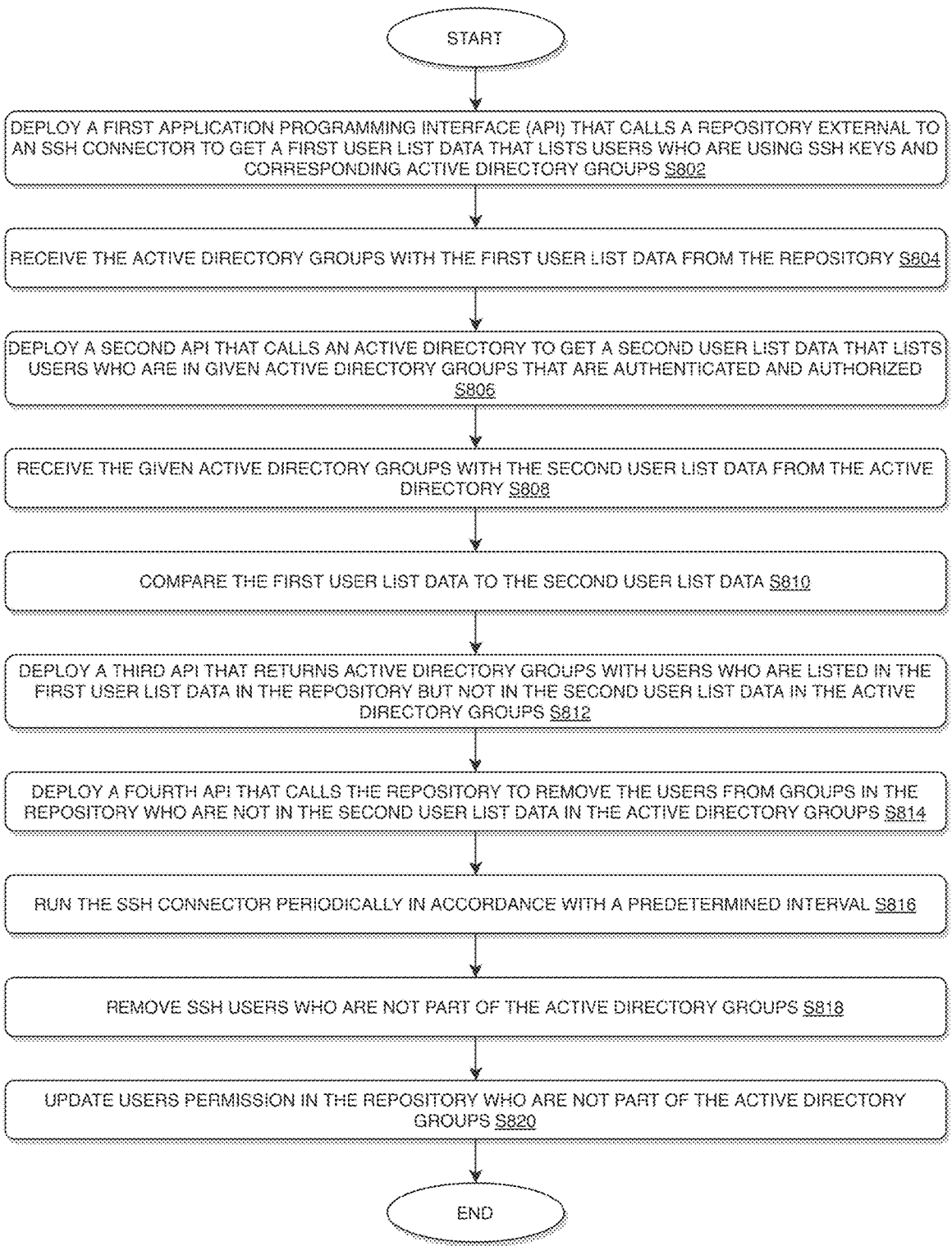
FIG. 8 illustrates a flow diagram for implementing an SSH connector module in accordance with an exemplary embodiment.

FIG. 8 illustrates a flow diagram for implementing an SSH connector module in accordance with an exemplary embodiment.

In the process 800 of FIG. 8, at step S802, a first application programming interface (API) may be deployed that calls a repository external to an SSH connector to get a first user list data that lists users who are using SSH keys and corresponding active directory groups.

At step S804, the active directory groups may be received with the first user list data from the repository.

At step S806, a second API may be deployed that calls an active directory to get a second user list data that lists users who are in given active directory groups that are authenticated and authorized.

At step S808, the given active directory groups may be received with the second user list data from the active directory.

At step S810, the first user list data may be compared to the second user list data.

At step S812, a third API may be deployed that returns active directory groups with users who are listed in the first user list data in the repository but not in the second user list data in the active directory groups.

At step S814, a fourth API may be deployed that calls the repository to remove the users from groups in the repository who are not in the second user list data in the active directory groups.

At step S816, the SSH connector may be run periodically in accordance with a predetermined interval (i.e., one hour, but the disclosure is not limited thereto).

At step S818. SSH users may be removed who are not part of the active directory groups.

At step S820, users' permission in the repository may be updated who are not part of the active directory groups.

According to exemplary embodiments, a non-transitory computer readable medium may be configured to store instructions for implementing a secure shell (SSH) connector. According to exemplary embodiments, the instructions, when executed, may cause a processor embedded within the SSHCM 406 or the SSHCD 402 to perform the following: deploying a first application programming interface (API) that calls a repository external to an SSH connector to get a first user list data that lists users who are using SSH keys and corresponding active directory groups, causing a receiver to receive the active directory groups with the first user list data from the repository; deploying a second API that calls an active directory to get a second user list data that lists users who are in given active directory groups that are authenticated and authorized; causing the receiver to receive the given active directory groups with the second user list data from the active directory; comparing the first user list data to the second user list data; deploying a third API that returns active directory groups with users who are listed in the first user list data in the repository but not in the second user list data in the active directory groups; and deploying a fourth API that calls the repository to remove the users from groups in the repository who are not in the second user list data in the active directory groups. The processor may be the same or similar to the processor 104 as illustrated in FIG. 1 or the processor embedded within SSHCD 202, SSHCD 302, SSHCM 306, SSHCD 402, and SSHCM 406.

According to exemplary embodiments, the instructions, when executed, may further cause the processor 104 to perform the following: running the SSH connector periodically in accordance with a predetermined interval; removing SSH users who are not part of the active directory groups; and updating users permission in the repository who are not part of the active directory groups.

According to exemplary embodiments as disclosed above in FIGS. 1-8, technical improvements effected by the instant disclosure may include platforms for implementing a secure shell (SSH) connector for SSH keys in a repository which may run periodically in accordance with a predetermined interval, remove SSH users who are not part of active directory groups, and update users permission in the repository who are not part of the active directory groups, thereby maintaining authorization and authentication for active directory teams in an organization as per active directory, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a secure shell (SSH) connector by utilizing one or more processors and one or more memories, the method comprising:
    deploying a first application programming interface (API) that calls a repository external to an SSH connector to get a first user list data that lists users who are using SSH keys and corresponding active directory groups;
    receiving the active directory groups with the first user list data from the repository;
    deploying a second API that calls an active directory to get a second user list data that lists users who are in given active directory groups that are authenticated and authorized;
    receiving the given active directory groups with the second user list data from the active directory;
    comparing the first user list data to the second user list data;
    deploying a third API that returns active directory groups with users who are listed in the first user list data in the repository but not in the second user list data in the active directory groups; and
    deploying a fourth API that calls the repository to remove the users from groups in the repository who are not in the second user list data in the active directory groups.

2. The method according to claim 1, wherein the repository is a web-based version control repository that stores source code for developing an application.

3. The method according to claim 1, wherein the repository is a cloud-based repository that supports user authentication, repository security, and integration with existing databases and developments.

4. The method according to claim 1, further comprising:
    running the SSH connector periodically in accordance with a predetermined interval;
    removing SSH users who are not part of the active directory groups; and
    updating users' permission in the repository who are not part of the active directory groups.

5. The method according to claim 4, wherein the predetermined interval is one hour.

6. The method according to claim 1, wherein the first API is a Get Bitbucket Group API.

7. The method according to claim 1, wherein the second API is a Get Active Directory Group API.

8. The method according to claim 1, wherein the active directory is a Microsoft® active directory.

9. The method according to claim 1, wherein the third API is a Validate Members in Group API.

10. The method according to claim 1, wherein the fourth API is a Remove Members in Group API.

11. A system for implementing a secure shell (SSH) connector, comprising:
    a processor;
    a receiver; and
    a repository, external to an SSH connector, operatively connected with the processor and the receiver via a communication network, the repository having one or more memories that store a first user list data that lists users who are using SSH keys and corresponding active directory groups;
    wherein the processor is configured to:
    deploy a first application programming interface (API) that calls the repository to get the first user list data;
    cause the receiver to receive the active directory groups with the first user list data from the repository;
    deploy a second API that calls an active directory to get a second user list data that lists users who are in given active directory groups that are authenticated and authorized;
    cause the receiver to receive the given active directory groups with the second user list data from the active directory;
    compare the first user list data to the second user list data;
    deploy a third API that returns active directory groups with users who are listed in the first user list data in the repository but not in the second user list data in the active directory groups; and deploy a fourth API that calls the repository to remove the users from groups in the repository who are not in the second user list data in the active directory groups.

12. The system according to claim 11, wherein the repository is a web-based version control repository that stores source code for developing an application.

13. The system according to claim 11, wherein the repository is a cloud-based repository that supports user authentication, repository security, and integration with existing databases and developments.

14. The system according to claim 11, wherein the processor is further configured to:

run the SSH connector periodically in accordance with a predetermined interval;

remove SSH users who are not part of the active directory groups; and update users' permission in the repository who are not part of the active directory groups.

15. The system according to claim 14, wherein the predetermined interval is one hour.

16. The system according to claim 11, The method according to claim 1, wherein the first API is a Get Bitbucket Group API.

17. The system according to claim 11, wherein the second API is a Get Active Directory Group API.

18. The system according to claim 11, wherein the active directory is a Microsoft® Active Directory.

19. The system according to claim 11, wherein the third API is a Validate Members in Group API, and wherein the fourth API is a Remove Members in Group API.

20. A non-transitory computer readable medium configured to store instructions for implementing a secure shell (SSH) connector, wherein when executed, the instructions cause a processor to perform the following:

deploying a first application programming interface (API) that calls a repository external to an SSH connector to get a first user list data that lists users who are using SSH keys and corresponding active directory groups;

causing a receiver to receive the active directory groups with the first user list data from the repository;

deploying a second API that calls an active directory to get a second user list data that lists users who are in given active directory groups that are authenticated and authorized;

causing the receiver to receive the given active directory groups with the second user list data from the active directory;

comparing the first user list data to the second user list data;

deploying a third API that returns active directory groups with users who are listed in the first user list data in the repository but not in the second user list data in the active directory groups; and deploying a fourth API that calls the repository to remove the users from groups in the repository who are not in the second user list data in the active directory groups.

* * * * *